Patented June 1, 1954

2,680,106

UNITED STATES PATENT OFFICE 2,680,106

COPOLYMERIC VINYLIDENE CHLORIDE COMPOSITIONS

Carl B. Havens, Hope, Mich., assignor to The Dow Chemical Company, Midland, Mich., a corporation of Delaware No Drawing. Application February 1, 1952, Serial No. 269,590

3 Claims. (Cl. 260—45.7)

This invention relates to a specific composition consisting essentially of a particular vinylidene chloride-vinyl chloride copolymer and small amounts of particular stabilizers and plasticizers therefor. It relates in particular to such a composition, capable of being dyed or pigmented to white or pastel shades and of being extruded and stretched conventionally to form filamentary products which do not darken during extrusion and which retain their intended color upon exposure to light.

A major use for the copolymer of 88 to 94 per cent vinylidene chloride and correspondingly from 12 to 6 per cent vinyl chloride is in the preparation of filaments, especially for use in heavy fabrics such as automobile seat covers, drapery fabrics and open weave insect screening. Hence, in its principal fields of use, the copolymer is exposed to sunlight. Such exposure results in darkening and discoloration of the filaments. The exposure and discoloration to which filaments are subject is much more severe than that to which such other articles as films are subject and it has been found that agents which can give sufficient protection to the polymer for use in films are inadequate to protect filamentary products.

The problem of discoloration is not limited to the clear or unpigmented compositions, but is especially noticeable and undesirable in those compositions which have white pigments or which have been dyed to pastel shades. The discoloration of unpigmented polymer normally progresses through a series of yellow and brown shades to an ultimate color approaching black. When the same light-induced degradation occurs in the copolymer containing any light color, the intended shade is changed due to the change in the polymer. This is especially noticeable in white, red and blue products. The white acquires a yellow tint, reds become orange, and blues become green. The change is progressive, and no constant or reproducible shade is obtained.

There is need for a vastly improved composition of the aforesaid vinylidene chloride-vinyl chloride copolymer which will be capable of extrusion to form filaments without thermally induced degradation or discoloration and whose filaments will be free from discoloration upon prolonged exposure to sources of ultraviolet radiations and will not exude their contained stabilizers or plasticizers upon aging after orientation. It is the object of this invention to provide such improved compositions and color stable filaments made from them.

It has now been found that the said desired results are attained when the composition employed for making the filaments consists essentially of the copolymer of 88 to 94 per cent vinylidene chloride and 12 to 6 per cent of vinyl chloride, together with from 0.1 to 5 per cent of the weight of the composition of tetrasodium pyrophosphate, from 2 to 6 per cent of salol (phenyl salicylate) and from 1 to 5 per cent of acetyl triethyl citrate, the combined weights of salol and the citrate not exceeding 9 per cent of the weight of the composition. Preferred compositions are those containing 0.1 to 1.5 per cent of the pyrophosphate and from 3 to 5 per cent each of the salol and the citrate, the total amounts of the last two constituents being kept at or below 9 per cent.

It is well known that salicylic acid esters have a light stabilizing action on halogen containing polymers. The ester of this type most commonly used with the copolymer here concerned has been tertiarybutylphenyl salicylate. It has been found, however, that the latter product confers upon filaments containing it only from 0.5 to 1 month useful life when exposed daily to sub-tropical (Florida) sunlight. Such filaments turn quite yellow within a month during such exposure. In contrast thereto, similar compositions containing salol, when exposed as filaments to Florida sunlight, have a useful life averaging about 4 months in any of a wide range of colors, but salol exudes badly from the filaments when present in amounts over 6 per cent of the weight of the composition. Compositions containing salol as the only organic modifier of the polymer in non-exuding quantities of 6 per cent or less are not easily extruded, because the salol exerts too little plasticizing effect at extrusion temperatures in those concentrations.

Acetyl triethyl citrate is known from U. S. Patent No. 2,429,165 to be a stabilizer for vinylidene chloride copolymers. This compound gives filaments containing it as the sole stabilizing agent a useful life in Florida sunlight of about 2 months. When used in amounts over 5 per cent, this compound also exudes badly from oriented filaments. When acetyl triethyl citrate is the only organic modifier present in the composition and is used in non-exuding quantities of 5 per cent or less, the compositions are not sufficiently plasticized to be extruded easily.

Because of the rather critical limits on the amounts of salol or of acetyl triethyl citrate which may be used alone without exudation from filaments of the copolymer here concerned, it would seem that the addition of any amounts of one of these agents to a composition which is saturated with respect to the other must necessarily result in an exuding filament, even though such addition might be presumed to facilitate extrusion. Similarly, because of the limited useful life of filaments containing acetyl triethyl citrate when exposed to intense sunlight, the admixture of this material and salol in the copolymer compositions might be expected to lower the resistance of the filaments to the degradatory effects of such exposure.

The usefulness of tetrasodium pyrophosphate in preventing thermal decomposition of vinylidene chloride polymers is well-known. It is considered a necessary part of the present compositions if they are to have all of the desired resistance to the adverse effects of heat and light.

Counter to the normal expectations, it has been found that the defined copolymer may contain as much as 5 per cent of acetyl triethyl citrate or as much as 6 per cent of salol, and an additional amount of the other, up to a total of 9 per cent of the two, without signs of exudation from the extruded and oriented filaments. When the combined amounts of both named agents is at least 6 per cent, extrusion proceeds readily at moderate temperatures. It is observed, as well, that the combination of the two organic stabilizers is more effective than a like amount of either one alone in prolonging the useful life of filaments when exposed to intense sunlight.

The following table illustrates the utility of the new compositions. In each case the test samples were prepared in the same manner and were exposed to the same conditions. Some samples contained pigments or dyes to determine whether they would retain the desired hue upon exposure to light. Some samples were heated 2 hours in an oven at 140° C. to observe the extent of any color change. Before extrusion under standard conditions, the copolymer of about 90 per cent vinylidene chloride and 10 per cent vinyl chloride was ground to a sufficient fineness to pass a 20-mesh screen (U. S. sieve series), and was mixed with the stated amount of tetrasodium pyrophosphate of 325-mesh fineness. This mixture was compounded with the organic stabilizers under test. When two such stabilizers were employed, they were first blended together to secure uniformity before stirring them into the polymer powder. Since all of the reported samples contained enough tetrasodium pyrophosphate to give a satisfactory thermal life, the "T-value" (time required at the melting point to induce rapid liberation of hydrogen chloride) is not reported. In each case, the "T-value" was at least double and usually triple that of the same composition without the pyrophosphate.

| Sample | Tetrasodium Pyrophosphate, Percent | Acetyl Triethyl Citrate, Percent | Salol, Percent | Percent retention of original ability to transmit visible light after— | | |
|---|---|---|---|---|---|---|
| | | | | Heating in oven 2 hours at 140° C. | 12 months' exposure to Florida sunlight | 320 hours' exposure in Fadeometer |
| Blank | | | | 83 | 25 | 61 |
| 1 | 1 | | | 91 | 33 | 64 |
| 2 | 5 | | | 82 | 32 | 63 |
| 3 | 1 | 5 | | 92 | 31 | 71 |
| 4 | 1 | | 3 | 80 | 57 | 70 |
| 5 | 1 | 1 | 3 | 66 | 61 | 81 |
| 6 | 1 | 3 | 3 | 71 | 71 | 84 |
| 7 | 1 | 5 | 0.5 | 90 | 42 | 73 |
| 8 | 1 | 5 | 1 | 92 | 47 | 78 |
| 9 | 0.5 | 5 | 3 | 82 | 65 | 76 |
| 10 | 1 | 5 | 3 | 90 | 65 | 85 |
| 11 | 3 | 5 | 3 | 78 | 69 | 89 |
| 12 | 1 | 7 | 3 | (1) | (1) | (1) |
| 13 | 1 | 8 | 3 | (1) | (1) | (1) |
| 14 | 1 | 9 | 1 | (1) | (1) | (1) |
| 15 | 1 | 4 | 5 | 72 | 72 | 86 |
| 16 | 1 | 1 | 6 | 90 | 75 | 90 |
| 17 | 1 | 3 | 6 | 77 | 75 | 77 |
| 18 | 1 | 4 | 6 | (1) | (1) | (1) |
| 19 | 1 | 5 | 6 | (1) | (1) | (1) |
| 20 | 1 | 5 | 8 | (1) | (1) | (1) |

¹ Exudes.

It is observed in the data in the foregoing table that, in the important matter of resistance to discoloration by sunlight, samples 1–4 and 7–3 are relatively unsatisfactory. Samples 12–14 and 18–20 each contained excessive combinations of the organic stabilizers and plasticizers, and are also unsatisfactory. The foregoing and other tests indicate that the amount of acetyl triethyl citrate may be from 1 to 5 per cent, and that of salol may be from 2 to 6 per cent (preferably 3–5 per cent), provided the aggregate amount of the two does not exceed 9 per cent. Dyed samples showed no change of hue in sunlight exposure tests over an average of 4 to 5 months, while dyed specimens of samples 1–3 changed hue noticeably in the course of a single month of exposure, and dyed specimens of sample 4 had a sunlight exposure life of about 2 months.

I claim:

1. A composition of matter consisting essentially of the copolymer of from 88 to 94 per cent vinylidene chloride and correspondingly 12 to 6 per cent vinyl chloride and from 0.5 to 5 per cent of the weight of the composition of tetrasodium pyrophosphate, from 1 to 5 per cent by weight of acetyl triethyl citrate, and from 2 to 6 per cent by weight of salol, the aggregate amounts of the citrate and salol not exceeding 9 per cent of the composition by weight.

2. A composition of matter consisting essentially of the copolymer of from 88 to 94 per cent vinylidene chloride and correspondingly 12 to 6 per cent vinyl chloride and from 0.5 to 1.5 per cent of the weight of the composition of tetrasodium pyrophosphate, from 1 to 5 percent by weight of acetyl triethyl citrate, and from 3 to 5 per cent by weight of salol, the aggregate amounts of the citrate and salol being at least 6 per cent and not exceeding 9 per cent of the composition by weight.

3. A composition of matter consisting essentially of the copolymer of from 88 to 94 per cent vinylidene chloride and correspondingly 12 to 6 per cent vinyl chloride and from 0.5 to 1.5 per cent of the weight of the composition of tetrasodium pyrophosphate, and from 3 to 5 per cent by weight each of acetyl triethyl citrate and salol, the aggregate amounts of the citrate and salol being at least 6 per cent and not exceeding 9 per cent of the composition by weight.

References Cited in the file of this patent

UNITED STATES PATENTS

| Number | Name | Date |
|---|---|---|
| 2,429,155 | Boyer | Oct. 14, 1947 |
| 2,429,165 | Matheson et al. | Oct. 14, 1947 |
| 2,477,656 | Schaefer et al. | Aug. 2, 1949 |